United States Patent
Hampton et al.

(10) Patent No.: US 9,618,933 B2
(45) Date of Patent: Apr. 11, 2017

(54) SYSTEM AND METHOD FOR VERIFYING THE CONFIGURATION AND INSTALLATION OF A MONITORING AND PROTECTION SYSTEM

(71) Applicant: General Electric Company, Schenectady, NY (US)

(72) Inventors: Aaron Roe Hampton, Minden, NV (US); Dustin Delany Hess, Minden, NV (US)

(73) Assignee: General Electric Company, Schenectady, NY (US)

( * ) Notice: Subject to any disclaimer, the term of this patent is extended or adjusted under 35 U.S.C. 154(b) by 395 days.

(21) Appl. No.: 14/177,161

(22) Filed: Feb. 10, 2014

(65) Prior Publication Data

US 2015/0227117 A1    Aug. 13, 2015

(51) Int. Cl.
*G05B 9/02*   (2006.01)
*G05B 11/01*  (2006.01)
*G05B 23/02*  (2006.01)

(52) U.S. Cl.
CPC ................................ *G05B 23/0256* (2013.01)

(58) Field of Classification Search
None
See application file for complete search history.

(56) References Cited

U.S. PATENT DOCUMENTS

| | | | |
|---|---|---|---|
| 4,057,714 A * | 11/1977 | Fork | F01D 21/00 702/34 |
| 5,455,781 A * | 10/1995 | Reynal | G01F 25/003 700/282 |
| 2004/0133319 A1 * | 7/2004 | Pillar | A62C 27/00 701/31.4 |
| 2007/0100478 A1 | 5/2007 | Egeland et al. | |
| 2007/0250227 A1 * | 10/2007 | Fossen | G05D 1/0875 701/21 |
| 2008/0312889 A1 | 12/2008 | Maier et al. | |
| 2009/0216511 A1 | 8/2009 | Babel et al. | |

FOREIGN PATENT DOCUMENTS

EP    0433995 A2   6/1991

OTHER PUBLICATIONS

PCT Search Report and Written Opinion issued in connection with corresponding PCT Application No. PCT/US2015/012456 on Apr. 23, 2015.

* cited by examiner

*Primary Examiner* — Wissam Rashid
(74) *Attorney, Agent, or Firm* — Fletcher Yoder, P.C.

(57) ABSTRACT

System and method for verifying a monitoring and protection system's (MPS) configuration and installation are disclosed. The MPS includes a plurality of input/output (I/O) channels configured to couple to at least one sensor sensing machinery operations, an analog-to-digital converter (ADC) communicatively coupled to the plurality of I/O channels, where the ADC is configured to receive at least one signal from the plurality of I/O channels communicated by the sensor and is configured to convert the signal to a digital data. The MPS also includes a processor communicatively coupled to the ADC, where the processor is configured to derive a state based on the digital data, and an excitation system communicatively coupled to the ADC, where the excitation system is configured to excite an excitation signal for a selected system state as a replacement for the signal.

16 Claims, 5 Drawing Sheets

100 ─┐
    V&V Report
102 ── Performed By: John Doe

104 ── Date: 2 / 61 / 2013

106 ── Site: Beta fakesite1

108 ── Summary:

110 ── 16 /16 Output Systems Verified:
    GE MkVIe controller     External Shutdown System     HMI     ....

112 ── Scenario 5: Bearing 1 High Vibration on Direct, requiring a Shutdown
114 ── Input: channel 6 on input card 2.

116 ── Exceeds over alarm level:2.6 mils pk pk

118 ── Effects:
        • External shutdown system, output relay 4
    120 ─┘   ○ Relay configuration:
            ▪ (SOME DIAGRAM OF THE RELAY CONFIGURATION)
        • GE MkVIk controller industrial protocol, EGD
    122 ─┘   ○ EGD mapping
            ▪ Extract of mapping
        • Device HMI, industrial protocol, modbus
          ○ Modbus mapping
            ▪ Extract of mapping
        • Control Room HMI, industrial protocol, modbus
          ○ Modbus mapping
            ▪ Extract of mapping 124 ── Verification
126 ── pass – external shutdown system trips when bearing 1 experiences high direct vibration 128 ── pass–GE MkVIe controller receives high vibration status from EGD protocol     pass–Device HMI indicates high vibration from bearing 1 pass–Control Room HMI indicates machine must be shut down from detected high vibration

SYSTEM AND METHOD FOR VERIFYING THE CONFIGURATION AND INSTALLATION OF A MONITORING AND PROTECTION SYSTEM

BACKGROUND

The subject matter disclosed herein relates to monitoring and protection systems and, more specifically, to verifying the configuration and installation of a monitoring and protection system connected to a machine system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Machine systems may include a variety of components and subsystems participating in a process. For example, a turbomachine is a type of machine system that may include fuel lines, combustors, sensors, turbine system, exhaust systems, and so forth, participating in the generation of power. Oftentimes, a monitoring and protection system (MPS) is connected to a turbomachine system that provides continuous monitoring of the turbomachine system by processing signals from the turbomachine system's sensors. The installation of a MPS may involve testing to verify that it is configured and wired properly to downstream systems. Generally, field engineers test the configuration by disconnecting individual sensors and connecting a function generator or probe to simulate the machine error conditions. This process may require a great deal of time and the testing hardware may be expensive. Additionally, errors may be introduced if the wiring is not reconnected correctly. Thus, there is a need for a more efficient way to verify the configuration of a MPS connected to a machine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a monitoring and protection system includes a plurality of input/output (I/O) channels communicatively coupled to at least one sensor sensing machinery operations, an analog-to-digital converter (ADC) communicatively coupled to the plurality of I/O channels, where the ADC is configured to receive at least one signal from the plurality of I/O channels communicated by the at least one sensor and is configured to convert the at least one signal to a digital data. The system also includes a processor communicatively coupled to the ADC, where the processor is configured to derive a state based on the digital data, and an excitation system communicatively coupled to the ADC, where the excitation system is configured to excite an excitation signal for a selected system state as a replacement for the at least one signal.

In a second embodiment, a computer-readable medium stores non-transitory computer instructions configured to select one or more desired system states correlative with machinery operations, excite one or more excited signals based on the one or more selected system states, process the one or more excited signals via a monitoring and protection system to derive one or more output signals, communicate the one or more output signals to one or more output channel, and monitor and log a behavior of a component of the monitoring and protection system when deriving the one or more output signals.

In a third embodiment, a method includes selecting at least one or more desired system states correlative with machinery operations, exciting one or more excited signals based on the one or more selected system states, processing the one or more excited signals via a monitoring and protection system to derive one or more output signals, communicating the one or more output signals to one or more output channel, and monitoring and logging the behavior of a component of the monitoring and protection system when deriving the one or more output signals.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. It is to be noted that although a turbomachine is used as an embodiment of a machine system to which the monitoring and protection system (MPS) may be connected, the MPS may be connected to any machine system, such as hydroelectric turbines, aeroderivative gas turbines, pulp and paper plants, and so forth.

Present embodiments relate to systems and methods for verifying the configuration (e.g., setup) and wiring of a monitoring and protection system (MPS) and downstream systems (e.g., controller systems, alarm/alert systems) without utilizing physical sensors or test hardware. In certain embodiments, the MPS may include an excitation system that is configured to bypass physical sensor input when commanded and excite sensor signals representing various system states that may drive connected relays and devices. That is, certain subsystem(s) of the MPS may be commanded to produce sensor signals representative of various states (e.g., turbine machinery startup, shutdown, trip, and so on) instead of physical sensors transmitting said signals. The produced sensor signals may then be transmitted to other MPS subsystems and downstream systems as described below, to verify and test that further processing of the produced sensor signals results is correct and/or valid. Thus, the excitation system may allow downstream processing to be tested, configuration to be verified, and downstream field wiring to be validated.

The techniques that will be described in more detail below may reduce time that would have been otherwise spent in manually connecting various physical testing machines (e.g., signal generators), operating the turbomachinery or other machine system, further testing of wiring, and so on, additionally saving money that would otherwise be spent on testing hardware. Further, the techniques described herein are particularly beneficial because a field engineer can verify and validate the hardware configuration and software programming of the MPS without having to turn on the turbomachine system or other machine system the MPS is protecting. For example, a field engineer may wire the MPS to the turbomachine's sensors, configure the MPS and desired industrial protocol communication exchanges, and wire the MPS's relay outputs to various downstream systems (e.g., plant control systems, alert/alarm systems, status indicators, and the like). The field engineer may then command the MPS to excite various machine signals at one or more levels that will drive the MPS through desired states, eventually driving the output relays or other connected devices, and the field engineer may confirm that the configuration and wiring of the MPS is correct.

Further, the techniques described herein may provide for a verification and validation reporting system that is configured to dynamically generate a report that displays at least the behavior of the observed signal representing a selected system state. The report may indicate whether the connected output systems (e.g., relays and other devices) behaved as expected for the excited signals output by the MPS. In this way, the report will let a field engineer and various systems know whether the MPS is properly wired and configured. The report generated may be visible on a display screen connected to the turbomachine or any other machine system that the MPS is monitoring and protecting. In other embodiments, the report may be communicated to external systems, such as test department systems, insurance company systems, and so forth. Thus, the verification and validation reporting system may enable faster verification at the customer site by easily providing customized reports.

Figure 1:
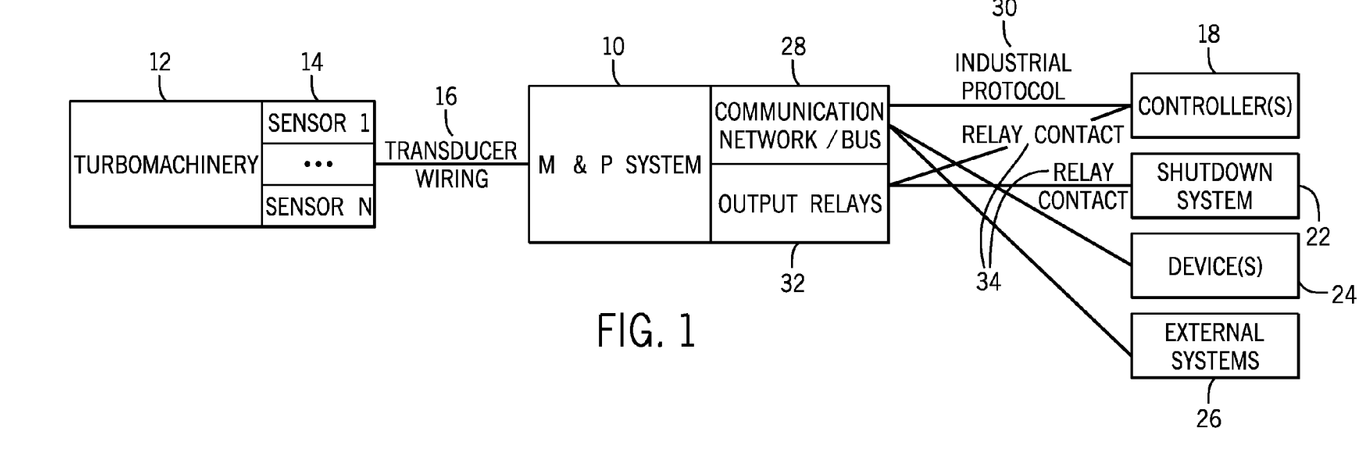
FIG. 1 is a block diagram of a monitoring and protection system (MPS) communicatively connected to other systems and devices, in accordance with an embodiment of the present approach.

With the foregoing in mind, it may be useful to describe an embodiment of a MPS 10, such as the 3701/44 ADAPT Monitor available from General Electric Company, of Schenectady, N.Y., and connections to various other systems and devices, as illustrated in FIG. 1. As previously mentioned, the MPS 10 may provide continuous online monitoring of machine systems, such as turbomachinery 12, by utilizing signal processing and other computing techniques. Specifically, the MPS 10 protects the turbomachinery 12 and other machine systems by continuously comparing and/or evaluating monitored parameters against configured alarm set points and may forward additional information to the turbomachinery's 12 control systems and other external systems, such as sensor measurements, turbomachinery 12 statuses, and the like. In some embodiments, the turbomachinery 12 may be aero-derivative gas turbines suitable for driving mechanical loads, such as a generator that may provide electric power to an electrical power grid.

As depicted, the MPS 10 may be connected to the turbomachinery's 12, or other machine systems', sensors 14 via a variety of wired and wireless conduit 16. The MPS 10 may have multiple input channels that are configured to accept input from the sensors 14, which may include proximity probes or magnetic pickup type speed sensors, among others. The 3701/44 ADAPT Monitor can accept up to twelve dynamic inputs, but other MPS 10 may accept more or less inputs. Depending on the hardware and configuration selection, each dynamic channel within the MPS 10 can perform the following measurements or functions: radial vibration, acceleration, velocity, thrust, temperature, clearance (e.g., distance between rotating and stationary components), flow, dynamic pressure, among others. These measurements and their corresponding levels may be used, for example, to drive alarms and/or to activate/deactivate certain relays. As such, the MPS 10 may be further connected to controller(s) 18, a shutdown system 22, other device(s) 24, and/or external systems 26 (e.g., alert systems, alarm systems, etc.). The MPS 10 may include a communication network/bus 28 that sends data over industrial protocol 30, such as Ethernet Global Data (EGD), Foundation Fieldbus, Modbus, HART, and/or TCP/IP, to the controller(s) 18. Likewise, the MPS 10 may include output relays 32 that drive relay contacts 34 to a variety of systems (e.g., including systems used during shutdown, startup, turbomachinery trip, etc.), the controller(s) 18, and/or the shutdown system 22 based upon certain logic (e.g., programming executable via one or more processors).

In order for the MPS 10 to operate as desired, the MPS 10 needs to be configured and wired to the appropriate systems and devices properly. Generally, a field engineer will test the configuration and wiring of the MPS 10 when it is installed at a customer site. Using the techniques described herein, the field engineer can accomplish this testing without having to operate the turbomachinery 12 or other machine system that the MPS 10 is protecting and without manually disconnecting each sensor and using dedicated testing devices (e.g. function generator) to generate signals correlative of sensor operations. Specifically, a field engineer may utilize a software user interface to test the MPS 10 through desired configuration stages. For example, the software may be used to walk through system states to verify that downstream relays are actuating as expected. It should be noted that the MPS 10 may be pre-configured to test the various devices' connections with set test cycles or scenarios. That is, the MPS 10 may be provided by the manufacturer with a suite of preconfigured tests to run (e.g., one or more manufacturer configured scenarios of system state signals). In other embodiments, the connection and scenario testing may be configured by a user. Once the MPS 10 is configured to verify the installation and given a command to proceed, the computer instructions stored on a tangible, non-transitory computer readable medium may bypass the sensor input and excite signals correlative of the sensor input and representing the system states that are to be tested.

Figure 2:
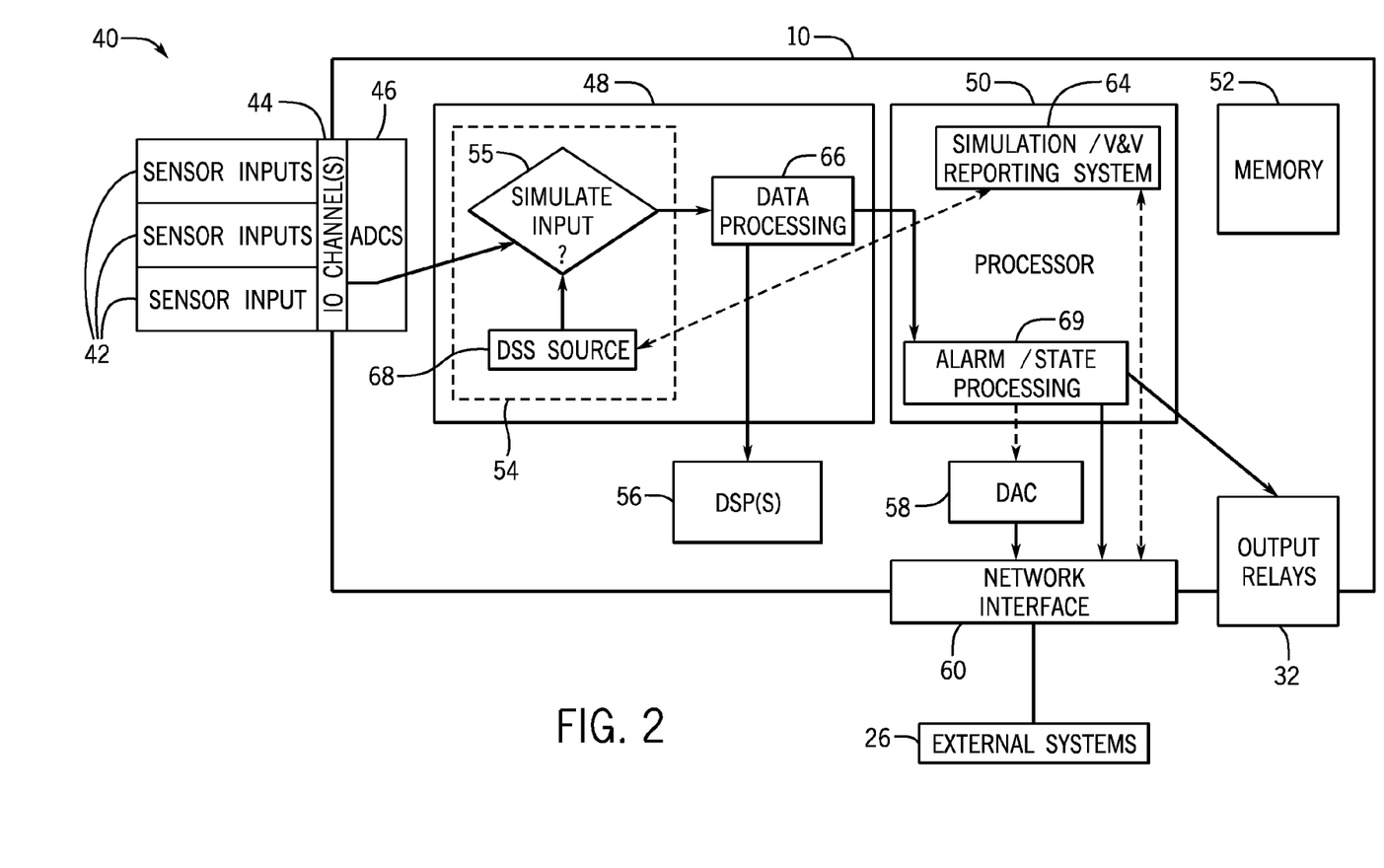
FIG. 2 is a block diagram of the MPS of FIG. 1 and related components, in accordance with an embodiment of the present approach.

The present techniques may be better described by turning to FIG. 2, which is a block diagram 40 of a MPS 10 and its components, in accordance with an embodiment of the present approach. The MPS 10 may include sensor inputs 42 (e.g., terminal blocks), input/output (I/O) channels 44 communicatively coupled to the sensor inputs 42, analog-to-digital converter(s) (ADC) 46, a programmable circuit 48, a processor 50, a memory 52, an excitation system 54, digital signal processor(s) (DSPs) 56, a digital-to-analog converter (DAC) 58, a network interface 60, output relays 32, and/or a verification and validation reporting system 64 that are all connected via a bus. In certain embodiments, the MPS 10 may perform signal processing with the DSP(s) 56 on signals received from sensor inputs 42 via sensors connected to a turbomachine system, among others. The analog signals arrive at the I/O channels 44 and are converted to digital data by the ADC(s) 46 before being sent to a programmable circuit 48 for data processing 66. In certain embodiments, a field-programmable gate array (FPGA) may be utilized to implement the programmable circuit 48. However, any technique suitable for implementing a programmable circuit may be utilized, such as an arduino board, a custom chip, and so forth.

The programmable circuit 48 contains certain components and functionality. For example, the programmable circuit 48 may contain the excitation system 54 represented by the dashed box, which may be a combination of computer code stored on a tangible, non-transitory computer readable medium and/or circuitry. The excitation system 54 will be described in greater detail below, but generally will be commanded by the processor 50 to excite signals for various system states using a digital signal synthesis (DSS) source 68 that replace the signals that would typically come from the sensor inputs 42 in the normal course of operation. The programmable circuit 48 may also contain computer code for data processing 66 that may communicate the digital data to the DSP(s) 56 to process the signal. The data processing 66 functionality may determine parameters and send the data to the processor 50 for alarm/state processing 69. The alarm/state processing 69 may derive a system state by comparing the parameters and configured system states and drive alarms accordingly. In some embodiments, the processed digital data representing a system state may be passed to the memory 52 (e.g., signal value database) from the programmable circuit 48.

The excitation system 54, when commanded by the processor 50, may determine to generate electric signals that simulate input 55. In one embodiment, the excitation system 54 may supplant data in a data-stream from the ADC(s) 46 with values from an internally excited DSS sine wave from the DSS source 68. It is to be understood that other waves (cosine, wavelets), curves, linear signals, and so on, may be excited by the excitation system 54. In another embodiment, the excitation system 54 may be used irrespective of data streaming into the ADC(s) 46, that is, the excitation system 54 may be used without the ADC(s) 46 receiving any data whatsoever. Indeed, the I/O channel(s) 44 may be disconnected from any sensor inputs 42 and the excitation system 54 may be used to generate electric signals.

The excitation system 54 may be enabled by utilizing password-protected security protocols (e.g., Hypertext Transfer Protocol Secure (HTTPS), Transport Layer Security (TSL), Challenge-Handshake Authentication Protocol (CHAP), etc.) for a particular power-on instance of the hardware, or by other techniques. The signals that are excited may represent a specific system state or states that are being tested. However, the signals may represent any number of properties capable of being represented by a sine wave, a cosine wave, wavelets, linear signals, non-linear signals, and the like. As depicted, once the excitation system 54 excites the signal(s), the remainder of the programmable circuit 48 functions as if the excited signals were real signals from the sensor inputs 42 connected to the turbomachinery or other machine system. In other words, once the excitation system 54 is commanded to operate, the other code and/or circuitry on the MPS 10 has no knowledge that it is being stimulated by anything other than sensor input 42 from turbomachinery or other machine system. All other processing on the MPS 10 remains intact and handles the excited signals just as it would real data from sensor inputs 42. Thus, the MPS 10 may not switch to a different operating mode when running through a configured testing cycle or scenario of system states using the excitation system 54. Further, in certain embodiments the excitation system 54 may be included as a component of the ADC 46 rather than as separate to the ADC 46. As depicted, the excitation system 54 may be provided as separate circuitry and/or computer code from the ADC 46 (e.g., a part of a programmable circuit 48).

After the alarm/state processing 69 occurs, the excited signal(s) may be sent to the network interface 60 and/or the output relays 32. In some embodiments, the MPS 10 may pass the signal(s) through the DAC 58 before being outputted in order to convert the signal(s) to analog form. Once the signal(s) are outputted, the MPS 10 may monitor and log the behavior of the signal(s) on the output systems. As the MPS 10 progresses through its testing cycle or scenario of system state excitation signals, the verification and validation reporting system 64 may dynamically generate a report reflecting the behavior of the MPS 10 and other systems (e.g., controller(s) 18, external systems 26) based on their performance when using the excitation signals. The report will show whether or not systems that receive the excited signals reacted as expected. As such, a field engineer can utilize the report generated as proof of proper installation, as a log of how the systems behaved at certain points in time, and so on.

The verification and validation system 64 may include computer instructions stored on a non-transitory, tangible computer readable medium that are configured to log the behavior of systems (e.g., MPS 10, controller(s) 18, external systems 26, etc.) that are excited by the excitation system 54. The excitation signals may be correlative to one or more system states, and each system state has an associated expected response from systems (e.g., systems 10, 18, 26) processing the excitation signals. In one embodiment, there may be four basic system state signals received at the I/O channels 44 (e.g. communicated via sensors) of the 3701/44 ADAPT, which include "OK-NoAlarms," "NotOK," "Alert," and "Danger." For speed sensors, there are additional states that include "Overspeed," "Underspeed," and "Deltaspeed." Any number of measurements may be derived from any channel, and the measurements include their own instances of the above four basic states. Any measurement or channel may be configured in any combination of relay logic. For example, Channel1.Alert+Channel2.Alert may drive a relay, or Channel1.BandpassMeasurement1.NotOK+Channel2.Alert+Channel3.NotOK may drive a relay, and so forth. Thus, the excitation system 54 may excite an "Alert" signal for Channel1 and Channel2, in the former instance, and the verification and validation reporting system 64 may expect that the appropriate relay actuates and log whether or not the actuation happens. If the relay does not actuate, then the report may indicate the relay's failure to actuate, and the field engineer will know to check the wiring and configuration of the MPS 10 related to that relay. Further, any measurement or computation derived by using the excitation signals may also be output by the network interface 60 via industrial protocol over Ethernet Global Data (EGD), Foundation Fieldbus, Modbus, HART, and/or TCP/IP to external systems 26 (e.g., a human-machine interface (HMI), a supervisory control and data acquisition (SCADA) system, a distributed control system (DCS), another controller, and so forth).

Figure 3:
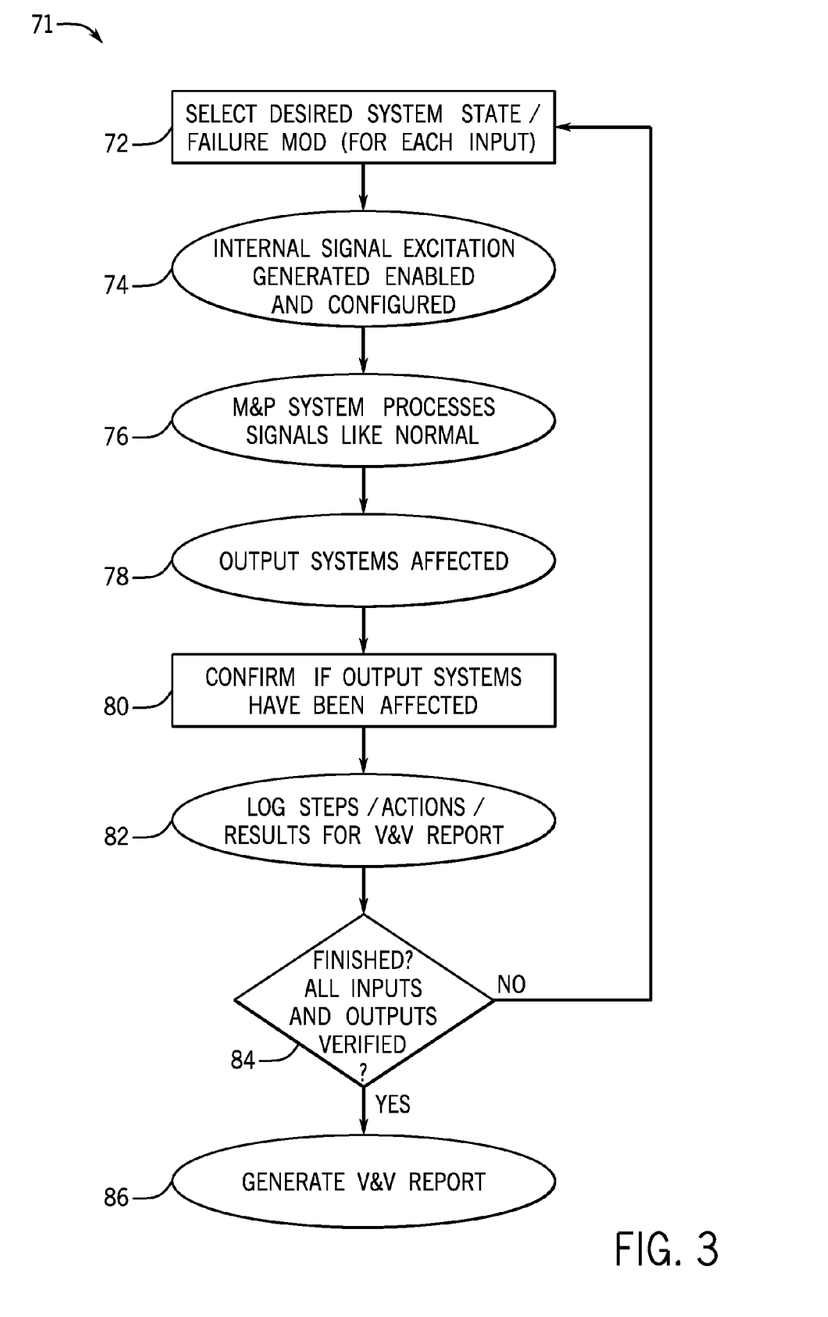
FIG. 3 is a flow diagram of a process utilized by the MPS of FIGS. 1 and 2 to excite signals, monitor the behavior of the signals and output systems, and generate a report, in accordance with an embodiment of the present approach.
Figure 5:
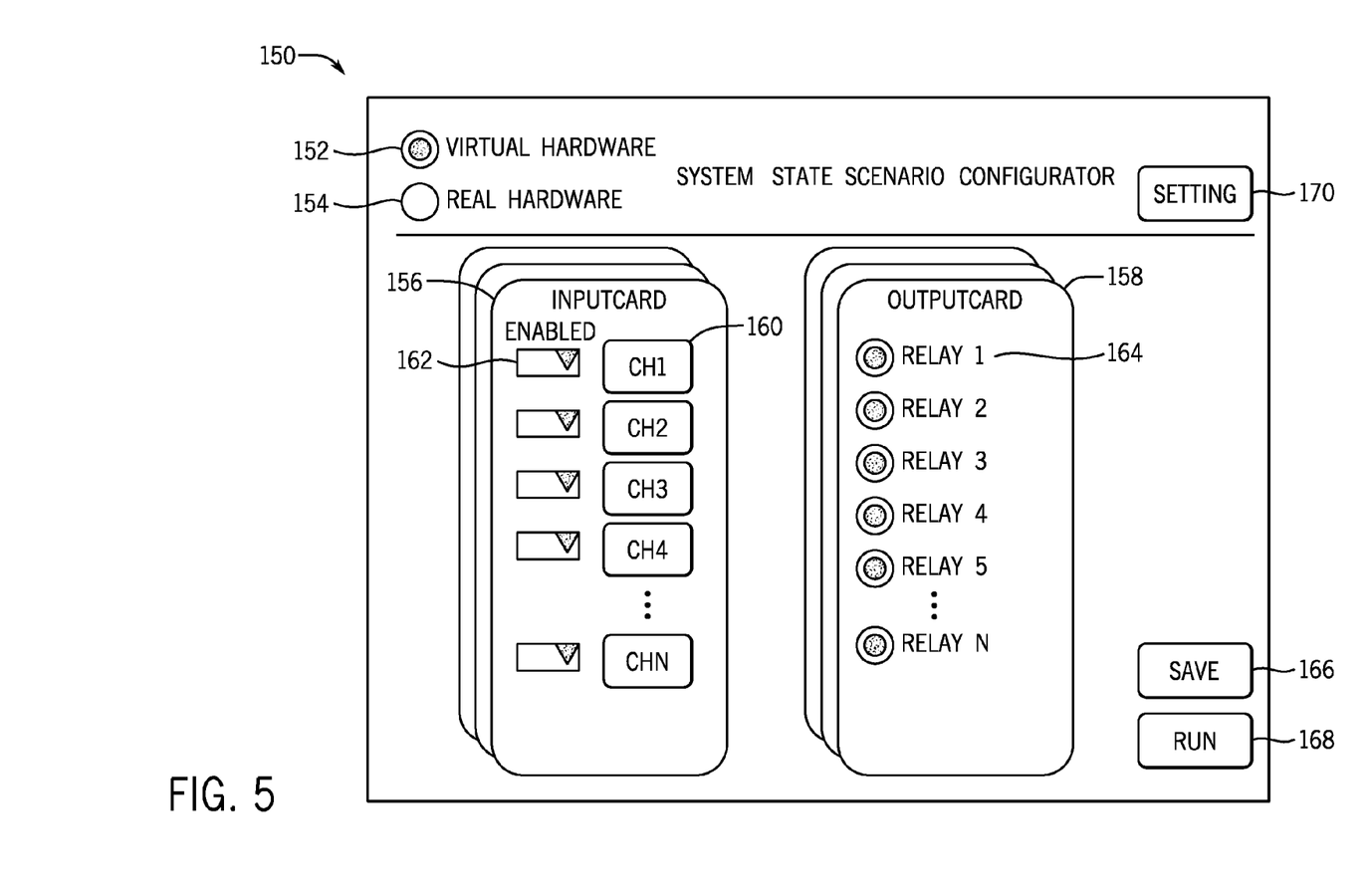
FIG. 5 is a view of a graphic user interface (GUI) utilized to test a configuration of the MPS of FIGS. 1 and 2, in accordance with an embodiment of the present approach.

FIG. 3 is a flow diagram of a process 71 that may be executed by the MPS 10 to excite signals, monitor the behavior of the signals and certain systems, and generate a report, in accordance with an embodiment of the present approach. In block 72, a desired system state and/or operation mode for each input is selected. In one embodiment, the MPS 10 has been pre-configured to test certain system states in a particular order (e.g., startup, steady state operation, shutdown, etc.). These configurations are generally referred to as testing cycles or scenarios herein. In another embodiment, a user may utilize a graphical user interface (GUI) to configure the scenarios or testing cycle (e.g., the system states to be excited and the order in which each is excited), as illustrated by FIG. 5 and discussed in detail below. In either embodiment, after the desired system state and/or failure mode are selected, the excitation system 54 will excite signal(s) that are configured based upon the selected system state (block 74). As previously mentioned, the signal(s) may be DSS sine waves, cosine waves, linear signals, non-linear signals, and the like. In block 76, the MPS 10 processes the excited signals using, for example, the processor 50 as it would process a signal that came from the sensor inputs 42 in the normal course of operation of the connected turbomachinery or other machine system. The signals to be output are then sent to the output relays 32 and/or communicated to external systems 26 via the network interface 60, and the corresponding output systems that may be affected in block 78.

The verification and validation reporting system 64 may monitor the behavior of the signal(s) and confirm if output systems (e.g., systems 10, 18, 26) have been affected as expected for the given scenario (block 80). Further, the verification and validation reporting system 64 may log the results (block 82). To reiterate from the above example, if the "Alert" signals excited for Channel1 and Channel2 did not drive a relay as desired, the verification and validation reporting system 64 will record that failure. In addition to the results, the verification and validation reporting system 64 may log the steps taken by the scenario, such as the channel for which signals were excited, the relay or network utilized, and the output system affected, among other things. Before generating the report, the verification and validation reporting system 64 may determine (decision 84) whether the excitation system is finished. That is, the process 71 determines at decision 84 whether all inputs and outputs for the scenario being run have been verified. If not complete, the process 71 may return to block 72 to select the desired system state and/or fault mode for another input and cycle through the process 71 until completion. Once the process 71 is complete, the verification and validation reporting system 64 will dynamically generate the report (block 86).

Figure 4:
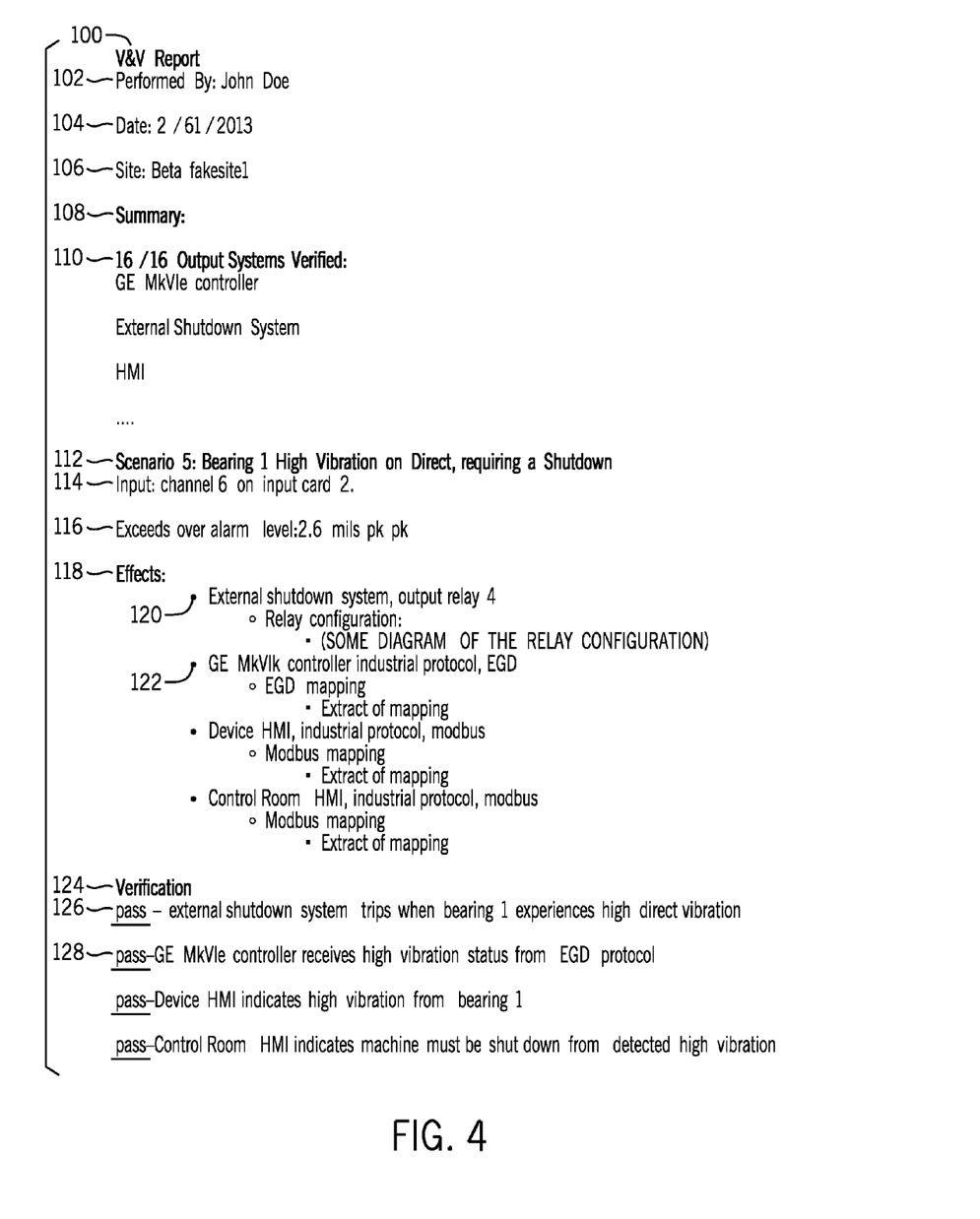
FIG. 4 is an embodiment of a report generated by a verification and validation reporting system included in the MPS of FIGS. 1 and 2, in accordance with an embodiment of the present approach.

FIG. 4 is an embodiment of a verification and validation report 100 generated by the verification and validation reporting system 64 included in the MPS 10. The verification and validation report 100 depicted may begin with a heading that includes several fields, such as a "performed by" field 102, a date field 104, and a site field 106. The "performed by" field 102 will typically include the field engineer's name that performed the test, the date field 104 may include the date timestamp when the report was generated or the test was completed, and the site field 106 may indicate the site at which the test was performed.

Generally, the verification and validation report 100 may include a "Summary" section 108 that includes subsections, such as the output systems verified 110, the scenario that was run 112, the expected effects of the scenario 118, and verification of the affects 124. In particular, the output systems verified subsection 110 may include a list of the output systems that were verified and a list of output systems that were not verified, including reason(s) for why the output systems were not verified. In one embodiment, the title of the output systems verified subsection 110 may be "16/16 Output Systems Verified," which indicates that all 16 output systems that were tested were verified; however any number of output systems may be used. Examples of output systems include controllers (e.g., "GE MkVIe controller"), external shutdown systems, HMI systems, SCADA systems, DCS systems, components of the MPS 10, and so forth. The subsection that indicates which scenario was run 112 may include a number identifying the scenario, a section of the turbomachine or other machine system being tested, the input from the sensor, and the result expected from that input. For example, a sample title may be "Scenario 5: Bearing 1 High Vibration on Direct, requiring a shutdown." In this subsection 112, information relating to the input 114 and the amount over alarm level 116 may be displayed. For example, the input that is being utilized in Scenario 5 is "channel 6 on input card 2." Thus, the excitation system 54 would excite a High Vibration on Direct signal from channel 6 to be processed by the MPS 10.

The subsection that describes the effects expected from the scenario 118 may provide a hierarchy (e.g., grouping) of information for each of the output systems that are affected. The heading for each grouping may include the name of the output system verified and the specific relay or communication network used to connect the MPS 10 and the output system. For example, since the external shutdown system is being verified in this scenario, one heading may be "External shutdown system, output relay 4" 120. Another example may be "GE MkVIe controller, industrial protocol, EGD" 122. Under each heading, the relay configuration or communication network mapping may be presented. This provides a field engineer with evidence that the wiring and configuration is accurate if the output system is verified. To that end, the verification subsection 124 may display the results for each of the output systems tested in the scenario. This subsection 124 may include a list indicating whether each output system passed or failed for the excited signal and details regarding what happened. For example, one item in the list may read, "pass—external shutdown system trips when bearing 1 experiences high direct vibration" 126. Another example may display "pass—GE MkVIe controller receives high vibration status from EGD protocol" 128.

As previously mentioned, once dynamically compiled, the verification and validation report 100 may be displayed to the field engineer on a display screen on a device (e.g., the MPS 10 or other devices). The device may be a handheld portable computing device such as a laptop, tablet, phone, or a personal digital assistant (PDA), or the device may be a standalone computer located next to the turbomachinery, or other machine system, or in a control room in the facility. The verification and validation report 100 may be communicated over the network interface 60 to external systems 26, such as the HMI, SCADA, DCS, controllers, insurance company's systems, or test department systems as proof of desired installation. Verification and validation reports 100 may be in any format viewable by a word processing program or a spreadsheet program. For example, the verification and validation report 100 may be a MICROSOFT® Word document, a MICROSOFT® Excel spreadsheet, and so forth.

In some embodiments, the verification and validation report 100 may be configurable by the field engineer to include certain parameters and fields, to rearrange subsections and headings, and the like. It should be noted that any combination of sections, subsections, headings, scenarios, and information may be displayed via the verification and validation report 100 and the foregoing embodiment was illustrative only and not intended to be limiting. Further, the verification and validation report 100 may be configured to be broadcast to any number of systems. Alternatively, in some embodiments, external systems 26 may communicate with the MPS 10 and request that the verification and validation report 100 be sent to their systems once it is compiled.

FIG. 5 is a view of a graphic user interface (GUI) 150 that may be displayed to test the configuration of the MPS 10, in accordance with an embodiment of the present approach. The GUI 150 may be referred to generally as a system state scenario configurator. The system state scenario configurator 150 may contain radio buttons (152 and 154), or any selectable graphic (menus, text boxes, drop down boxes, combo boxes, check boxes, etc.), for a user to choose between testing with virtual hardware or real hardware. In the depicted embodiment, the user has selected the radio button 152 to test with virtual hardware. The GUI 150 may contain one or more input card menus 156 and one or more output card menus 158. The input card menu(s) 156 may contain a plurality of channels 160, which represent sensor input from a connected machine system, such as a turbomachine system, among others.

Additionally, the input card menu(s) 156 may contain a drop down list or selectable graphic 162 associated with each channel 160. From the selectable graphic 162, a user may select which system state (listed above) to excite for a particular channel 160. On the output card menu 158, the user may choose which relay(s) 164 (or other actuators) the channel 160 and system state combination should drive. This configuration results in a system state scenario as referred to above, which may be saved using the save button 166 and/or the scenario may be run using the run button 168. A user can also modify the system state scenario configurator's 150 settings with the settings button 170. For example, the settings button 170 may allow the user to change the address of the real hardware, the number of channels 160 on an input card 156, the number of relays 164 on an output card 158, and so forth. It should be noted that in other embodiments the MPS 10 may contain default scenarios to excite various system state signals for selected channels 160 and monitor the response of the connected relays 164 and devices. Using the present techniques described above with the system state scenario configurator 150, a user may customize scenarios to completely test the configuration and wiring of the MPS 10. Further, the scenarios may be reused at later times if saved.

Technical effects of the described embodiments include enabling the validation and verification of the configuration and installation of a MPS 10 connected to a machine system. Certain embodiments may enable testing the configuration and installation without having to disconnect sensors individually, use expensive testing hardware, and/or turn on the machine system the MPS 10 is protecting. Thus, the disclosure may save a field engineer a great deal of time performing verification and validation, as well as save an entity that owns the machine system money by reducing the cost of ownership of testing hardware. In some embodiments, a field engineer may utilize a software user interface to test the MPS 10 through desired configuration stages. For example, the software may be used to walk through system states to verify that downstream relays are actuating as expected. As mentioned above, the MPS 10 may be pre-configured to test the various devices' connections with set test cycles or scenarios. In other embodiments, the connection and scenario testing may be configured by a user. Once the MPS 10 is configured to verify the installation and given a command to proceed, the circuitry and/or computer instructions stored on a tangible, non-transitory computer readable medium may bypass the sensor input and excite signals correlative of the sensor input and representing the system states that are to be tested.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The invention claimed is:

1. A monitoring and protection system comprising:
   a plurality of input/output (I/O) channels communicatively coupled to at least one sensor sensing machinery operations;
   an analog-to-digital converter (ADC) communicatively coupled to the plurality of I/O channels, wherein the ADC is configured to receive at least one signal from the plurality of I/O channels communicated by the at least one sensor and is configured to convert the at least one signal to a digital data;
   a processor communicatively coupled to the ADC, wherein the processor is configured to derive a state based on the digital data; and
   an excitation system included as a component of the ADC, wherein the excitation system is configured to excite an excitation signal for a selected system state as a replacement for the at least one signal; and
   a first component, wherein the first component is configured to process the excitation signal in lieu of the replaced at least one sensor signal transmitted via the at least one sensor.

2. The monitoring and protection system of claim 1, comprising a verification and validation reporting system configured to dynamically generate a report displaying a response of a component of the monitoring and protection system, an external system, or a combination thereof, to the excitation signal.

3. The monitoring and protection system of claim 2, wherein the verification and validation reporting system is configured to communicate the report to external systems.

4. The monitoring and protection system of claim 1, wherein the selected system state comprises OK-NoAlarms, NotOK, Alert, Danger, Overspeed, Underspeed, or Deltaspeed.

5. The monitoring and protection system of claim 1, wherein the excitation system is configured to utilize a password-protected security protocol.

6. The monitoring and protection system of claim 1, wherein the excitation system comprises one or more manufacturer configured scenarios of system state signals.

7. The monitoring and protection system of claim 1, wherein the excitation system comprises one or more user-configurable scenarios of system state signals.

8. A computer-readable medium storing non-transitory computer instructions, the computer instructions configured to:
   select one or more desired system states correlative with machinery operations;
   excite one or more excited signals based on the one or more selected system states, wherein the one or more excited signals are excited by an excitation system included in an analog to digital converter (ADC) to replace at least one sensor signal from at least one sensor sensing machinery operations;
   process the one or more excited signals via a monitoring and protection system in lieu of the replaced at least one sensor signal transmitted via the at least one sensor to derive one or more output signals;
   communicate the one or more output signals to one or more output channel; and
   monitor and log a behavior of a component of the monitoring and protection system when deriving the one or more output signals.

9. The computer-readable medium storing non-transitory computer instructions of claim 8, wherein the one or more system state comprise OK-NoAlarms, NotOK, Alert, Danger, Overspeed, Underspeed, Deltaspeed, or a combination thereof.

10. The computer-readable medium storing non-transitory computer instructions of claim 9, wherein the excitation system is configured to utilize a password-protected security protocol.

11. The computer-readable medium storing non-transitory computer instructions of claim 8, comprising instructions configured to generate a verification and validation report based on the log behavior.

12. The computer-readable medium storing non-transitory computer instructions of claim 11, comprising instructions configured to monitor and log a behavior of a system external to the monitoring and protection system based on the one or more output signals.

13. A method comprising:
   selecting at least one or more desired system states correlative with machinery operations;
   exciting one or more excited signals based on the one or more selected system states, wherein the one or more excited signals are excited by an excitation system included in an analog to digital converter (ADC) to replace at least one sensor signal from at least one sensor sensing machinery operations;
   processing the one or more excited signals via a monitoring and protection system in lieu of the replaced at least one sensor signal transmitted via the at least one sensor to derive one or more output signals;
   communicating the one or more output signals to one or more output channel; and
   monitoring and logging the behavior of a component of the monitoring and protection system when deriving the one or more output signals.

14. The method of claim 13, wherein the replaced at least one sensor signal is received from an Input/Output (I/O) channel.

15. The method of claim 13, wherein the excitation system is configured to utilize a password-protected security protocol.

16. The method of claim 13, comprising generating a verification and validation report based on the log behavior and communicating the report to external systems.

* * * * *